United States Patent
Stratton et al.

(10) Patent No.: US 9,507,150 B1
(45) Date of Patent: Nov. 29, 2016

(54) HEAD UP DISPLAY (HUD) USING A BENT WAVEGUIDE ASSEMBLY

(71) Applicants: Eric P. Stratton, Portland, OR (US); Christopher M. Buchholz, West Linn, OR (US); Robert D. Brown, Lake Oswego, OR (US); Christopher A. Keith, Wilsonville, OR (US); James H. Stanley, Palo Alto, CA (US)

(72) Inventors: Eric P. Stratton, Portland, OR (US); Christopher M. Buchholz, West Linn, OR (US); Robert D. Brown, Lake Oswego, OR (US); Christopher A. Keith, Wilsonville, OR (US); James H. Stanley, Palo Alto, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 103 days.

(21) Appl. No.: 13/892,026

(22) Filed: May 10, 2013

(51) Int. Cl.
*G02B 27/14* (2006.01)
*G02B 27/01* (2006.01)

(52) U.S. Cl.
CPC ....... *G02B 27/0101* (2013.01); *G02B 27/0103* (2013.01); *G02B 2027/0118* (2013.01)

(58) Field of Classification Search
CPC .......... G02B 27/0101; G02B 27/0103; G02B 27/0118; G02B 27/012; G02B 27/0121; G02B 27/0141; G02B 27/0149; G02B 2027/0103; G02B 2027/0109; G02B 2027/0118; G02B 2027/012; G02B 2027/0121; G02B 2027/0141; G02B 2027/0149
USPC ......... 359/566, 569, 572, 575, 576, 13, 630, 359/632, 633; 349/7–9; 348/115
See application file for complete search history.

(56) References Cited

U.S. PATENT DOCUMENTS

| | | |
|---|---|---|
| 2,141,884 A | 12/1938 | Sonnefeld |
| 3,620,601 A | 11/1971 | Waghorn |
| 3,851,303 A | 11/1974 | Muller |
| 3,885,095 A | 5/1975 | Wolfson et al. |
| 3,940,204 A | 2/1976 | Withrington |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |
| 4,309,070 A | 1/1982 | St. Leger Searle |

(Continued)

FOREIGN PATENT DOCUMENTS

| | | |
|---|---|---|
| CN | 101881936 A | 11/2010 |
| DE | 1020060 03 785 | 7/2007 |

(Continued)

OTHER PUBLICATIONS

Office Action on U.S. Appl. No. 13/250,940 Dated Mar. 25, 2014, 12 pages.

(Continued)

*Primary Examiner* — Thomas K Pham
*Assistant Examiner* — Marin Pichler
(74) *Attorney, Agent, or Firm* — Donna P. Suchy; Daniel M. Barbieri (57) ABSTRACT

The head up display provides light from an image source. The head up display includes a waveguide assembly comprising a first waveguide for disposition at an angle with respect to a top surface of a glare shield and a second waveguide disposed at an angle with respect to the first waveguide. The first waveguide has a first diffractive coupler at a first end and a second waveguide has a second diffractive coupler at a second end. The first waveguide is positioned as a combiner and allows viewing of an outside scene and information from the image source. At least part of the first waveguide is disposed beneath the top surface of a glare shield.

14 Claims, 2 Drawing Sheets

(56) References Cited

U.S. PATENT DOCUMENTS

| | | |
|---|---|---|
| 4,647,967 A | 3/1987 | Kirschner et al. |
| 4,711,512 A | 12/1987 | Upatnieks |
| 4,714,320 A | 12/1987 | Banbury |
| 4,743,083 A | 5/1988 | Schimpe |
| 4,749,256 A | 6/1988 | Bell et al. |
| 4,775,218 A | 10/1988 | Wood et al. |
| 4,854,688 A | 8/1989 | Hayford et al. |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,303,085 A | 4/1994 | Rallison |
| 5,317,405 A | 5/1994 | Kuriki et al. |
| 5,341,230 A | 8/1994 | Smith |
| 5,351,151 A | 9/1994 | Levy |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,856,842 A | 1/1999 | Tedesco |
| 5,868,951 A | 2/1999 | Schuck et al. |
| 5,886,822 A | 3/1999 | Spitzer |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,563,648 B2 | 5/2003 | Gleckman et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,690,516 B2 | 2/2004 | Aritake et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,757,105 B2 | 6/2004 | Niv et al. |

(56) References Cited

U.S. PATENT DOCUMENTS

| | | |
|---|---|---|
| 6,771,403 B1 | 8/2004 | Endo et al. |
| 6,776,339 B2 | 8/2004 | Piikivi |
| 6,781,701 B1 | 8/2004 | Sweetser et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,861 B2 | 3/2005 | Schehrer et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |

(56) References Cited

U.S. PATENT DOCUMENTS

| | | |
|---|---|---|
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | Dejean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,254,031 B2 | 8/2012 | Levola |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,335,040 B2 | 12/2012 | Mukawa et al. |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,472,119 B1 * | 6/2013 | Kelly ............... 359/630 |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,547,638 B2 | 10/2013 | Levola |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,634,139 B1 | 1/2014 | Brown et al. |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,670,029 B2 | 3/2014 | McEldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,749,886 B2 | 6/2014 | Gupta |
| 8,749,890 B1 | 6/2014 | Wood et al. |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,903,207 B1 | 12/2014 | Brown et al. |
| 8,913,324 B2 | 12/2014 | Schrader |
| 8,937,772 B1 | 1/2015 | Burns et al. |
| 8,938,141 B2 | 1/2015 | Magnusson |
| 2002/0021461 A1 | 2/2002 | Ono et al. |
| 2002/0131175 A1 | 9/2002 | Yagi et al. |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0089842 A1 | 5/2004 | Sutherland et al. |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0093793 A1 | 5/2006 | Miyakawa et al. |
| 2006/0114564 A1 | 6/2006 | Sutherland et al. |
| 2006/0119916 A1 | 6/2006 | Sutherland et al. |
| 2006/0132914 A1 | 6/2006 | Weiss et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv et al. |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0296163 A1 | 11/2010 | Saarikko |
| 2010/0315719 A1 | 12/2010 | Saarikko et al. |
| 2010/0321781 A1 | 12/2010 | Levola et al. |

(56) References Cited

U.S. PATENT DOCUMENTS

| | | |
|---|---|---|
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0235179 A1 | 9/2011 | Simmonds |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0300311 A1 | 11/2012 | Simmonds et al. |
| 2012/0320460 A1 | 12/2012 | Levola |
| 2013/0069850 A1 | 3/2013 | Mukawa et al. |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0200710 A1 | 8/2013 | Robbins |
| 2013/0249895 A1 | 9/2013 | Westerinen et al. |
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0104665 A1 | 4/2014 | Popovich et al. |
| 2014/0104685 A1 | 4/2014 | Bohn et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2015/0010265 A1 | 1/2015 | Popovich et al. |
| 2015/0289762 A1 | 10/2015 | Popovich et al. |

FOREIGN PATENT DOCUMENTS

| | | |
|---|---|---|
| EP | 2 110 701 | 10/2009 |
| EP | 2 225 592 | 9/2010 |
| EP | 2 381 290 | 10/2011 |
| EP | 2 733 517 | 5/2014 |
| FR | 2677463 | 12/1992 |
| GB | 2 115 178 A | 9/1983 |
| JP | 2004-157245 | 6/2004 |
| WO | WO-99/52002 | 10/1999 |
| WO | WO-03/081320 A1 | 10/2003 |
| WO | WO-2006/002870 | 1/2006 |
| WO | WO-2007/130130 A2 | 11/2007 |
| WO | WO-2007/130130 A3 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2010/125337 A3 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |

OTHER PUBLICATIONS

Office Action on U.S. Appl. No. 13/251,087 Dated Mar. 28, 2014, 12 pages.

Non-Final Office Action on U.S. Appl. No. 13/250,858 Dated Sep. 15, 2014, 16 pages.

Notice of Allowance on U.S. Appl. No. 13/250,970 dated Sep. 16, 2014, 7 pages.

Notice of Allowance on U.S. Appl. No. 13/251,087 Dated Jul. 17, 2014, 8 pages.

Ayras et al., Exit Pupil Expander with a Large Field of View Based on Diffractive Optics, Journal of the SID, 2009, 6 pages.

Notice of Allowance for U.S. Appl. No. 12/700,557, mail date Oct. 22, 2013, 9 pages.

Office Action for U.S. Appl. No. 12/700,557, mail date Aug. 9, 2013, 12 pages.

Office Action for U.S. Appl. No. 12/700,557, mail date Feb. 4, 2013, 11 pages.

Office Action for U.S. Appl. No. 13/250,858 Dated Feb. 19, 2014, 13 page.

Cameron, A., The Application of Holographic Optical Waveguide Technology to Q-Sight Family of Helmet Mounted Displays, Proc. of SPIE, vol. 7326, 7326OH-1, 2009, 11 pages.

Office Action for U.S. Appl. No. 13/250,621, mail date May 21, 2013, 10 pages.

Office Action for U.S. Appl. No. 13/250,858, mail date Oct. 28, 2013, 9 pages.

Office Action for U.S. Appl. No. 13/250,940, mail date Aug. 28, 2013, 15 pages.

Office Action for U.S. Appl. No. 13/250,940, mail date Mar. 12, 2013, 11 pages.

Office Action for U.S. Appl. No. 13/250,970, mail date Jul. 30, 2013, 4 pages.

Office Action for U.S. Appl. No. 13/250,994, mail date Sep. 16, 2013, 11 pages.

Wisely, P.L., Head up and head mounted display performance improvements through advanced techniques in the manipulation of light, Proc. of SPIE vol. 7327, 732706-1, 2009, 10 pages.

Final Office Action on U.S. Appl. No. 13/250,940 Dated Oct. 17, 2014, 15 pages.

Irie, Masahiro, Photochromic diarylethenes for photonic devices, Pure and Applied Chemistry, 1996, pp. 1367-1371, vol. 68, No. 7, IUPAC.

Non-Final Office Action on U.S. Appl. No. 13/864,991 Dated Oct. 22, 2014, 16 pages.

Office Action on U.S. Appl. No. 13/892,057 Dated Nov. 28, 2014, 17 pages.

Plastic has replaced glass in photochromic lens, www.plastemart.com, 2003, 1 page.

Webster's Third New International Dictionary 433 (1986), 3 pages.

Final Office Action on U.S. Appl. No. 13/250,858 Dated Feb. 4, 2015, 18 pages.

Non-Final Office Action on U.S. Appl. No. 14/038,400 Dated Feb. 5, 2015, 18 pages.

Final Office Action in U.S. Appl. No. 13/864,991, dated Apr. 2, 2015, 16 pages.

Final Office Action on U.S. Appl. No. 13/892,057 Dated Mar. 5, 2015, 21 pages.

Amendment and Reply for U.S. Appl. No. 12/571,262, mail date Dec. 16, 2011, 7 pages.

(56) References Cited

OTHER PUBLICATIONS

Amitai, Y., et al. "Visor-display design based on planar holographic optics," Applied Optics, vol. 34, No. 8, Mar. 10, 1995, pp. 1352-1356.

Ayras, et al., "Exit pupil expander with a large field of view based on diffractive optics", Journal of the Society for Information Display, 17/8, 2009, pp. 659-664.

Caputo, R. et al., Policryps Switchable Holographic Grating: A Promising Grating Electro-Optical Pixel for High Resolution Display Application; Journal of Display Technology, vol. 2, No. 1, Mar. 2006, pp. 38-51, 14 pages.

Crawford, "Switchable Bragg Gratings", Optics & Photonics News, Apr. 2003, pp. 54-59.

Extended European Search Report for EP Application No. 13192383, dated Apr. 2, 2014, 7 pages.

Final Office Action on U.S. Appl. No. 13/869,866 Dated Oct. 3, 2014, 17 pages.

Final Office Action on U.S. Appl. No. 14/038,400 Dated Aug. 10, 2015, 32 pages.

First office action received in Chinese patent application No. 201380001530.1, dated Jun. 30, 2015, 9 pages with English translation.

International Preliminary Report on Patentability for PCT Application No. PCT/US2013/038070, dated Oct. 28, 2014, 6 pages.

International Search Report and Written Opinion regarding PCT/US2013/038070, mail date Aug. 14, 2013, 14 pages.

Levola, et al., "Replicated slanted gratings with a high refractive index material for in and outcoupling of light" Optics Express, vol. 15, Issue 5, pp. 2067-2074 (2007).

Moffitt, "Head-Mounted Display Image Configurations", retrieved from the internet at http://www.kirkmoffitt.com/hmd_image_configurations.pdf on Dec. 19, 2014, dated May 2008, 25 pages.

Non-Final Office Action on U.S. Appl. No. 13/869,866 Dated Jul. 22, 2015, 28 pages.

Non-Final Office Action on U.S. Appl. No. 13/892,057 dated Jul. 30, 2015, 29 pages.

Non-Final Office Action on U.S. Appl. No. 13/250,858 dated Jun. 12, 2015, 20 pages.

Non-Final Office Action on U.S. Appl. No. 13/250,940 Dated Mar. 18, 2015, 17 pages.

Non-Final Office Action on U.S. Appl. No. 13/432,662 Dated May 27, 2015, 15 pages.

Non-Final Office Action on U.S. Appl. No. 13/844,456 Apr. 1, 2015, XX Pages.

Non-Final Office Action on U.S. Appl. No. 13/869,866 Dated May 28, 2014, 16 pages.

Non-Final Office Action on U.S. Appl. No. 14/044,676 Dated Apr. 9, 2015, 13 pages.

Non-Final Office Action on U.S. Appl. No. 14/109,551 Dated Jul. 14, 2015, 32 pages.

Non-Final Office Action on U.S. Appl. No. 14/168,173 Dated Jun. 22, 2015, 14 pages.

Non-Final Office Action on U.S. Appl. No. 14/225,062 Dated May 21, 2015, 11 pages.

Nordin, G., et al., Journal of the Optical Society of America A., vol. 9, No. 12, Dec. 1992, pp. 2206-2217, 12 pages.

Notice of Allowance on U.S. Appl. No. 13/355,360 Dated Apr. 10, 2014, 7 pages.

Office Action for U.S. Appl. No. 12/571,262, mail date Sep. 28, 2011, 5 pages.

Office Action for U.S. Appl. No. 13/355,360, mail date Sep. 12, 2013, 7 pages.

Office Action, U.S. Appl. No. 10/696,507, mailed on Nov. 13, 2008 (CTX-290US), 15 pages.

Press Release, "USAF Awards SBG Labs an SBIR Contract for Wide Field of View HUD", SBG Labs—DigiLens, Apr. 2013, 1 page.

Press Release: "Navy awards SGB Labs a contract for HMDs for simulation and training", Press releases, DigiLens, Oct. 2012, pp. 1-2, retrieved from the internat at http://www.digilens.com/pr10-2012.2.php. 2 pages.

Requirement for Restriction/Election on U.S. Appl. No. 13/844,456 Dated Sep. 12, 2014, 23 pages.

Schechter, et al., "Compact beam expander with linear gratings", Applied Optics, vol. 41, No. 7, Mar. 1, 2002, pp. 1236-1240.

Urey, "Diffractive exit pupil expander for display applications" Applied Optics, vol. 40, Issue 32, pp. 5840-5851 (2001).

Non-Final Office Action on U.S. Appl. No. 14/152,756, mail date Aug. 25, 2015, 39 pages.

U.S. Appl. No. 13/250,858, filed Sep. 30, 2011, Brown et al.
U.S. Appl. No. 13/250,940, filed Sep. 30, 2011, Stahl et al.
U.S. Appl. No. 13/432,662, filed Mar. 28, 2012, Brown et al.
U.S. Appl. No. 14/497,280, filed Sep. 25, 2014, Stanley et al.
U.S. Appl. No. 14/715,332, filed May 18, 2015, Brown et al.

Extract of US 2010/0296163 (Saarikko), Figure 2 as marked up by Examiner in Final Office Action for U.S. Appl. No. 14/044,676 dated Oct. 20, 2015, 1 page.

Final Office Action on U.S. Appl. No. 14/044,676, dated Oct. 20, 2015, 18 pages.

Final Office Action on U.S. Appl. No. 13/250,858, dated Oct. 7, 2015, 20 pages.

Final Office Action on U.S. Appl. No. 13/432,662, dated Oct. 29, 2015, 9 pages.

Final Office Action on U.S. Appl. No. 13/892,057 dated Nov. 20, 2015, 30 pages.

Final Office Action on U.S. Appl. No. 14/152,756, dated Dec. 21, 2015, 15 pages.

Non-Final Office Action on U.S. Appl. No. 13/844,456, dated Jan. 15, 2016, 16 Pages.

Non-Final Office Action on U.S. Appl. No. 14/044,676, dated Jan. 20, 2016, 21 pages.

Non-Final Office Action on U.S. Appl. No. 14/465,763, dated Nov. 19, 2015, 4 pages.

Notice of Allowance for U.S. Appl. No. 14/109,551, dated Nov. 20, 2015, 8 pages.

Notice of Allowance on U.S. Appl. No. 13/432,662, dated Feb. 18, 2016, 10 pages.

Notice of Allowance on U.S. Appl. No. 14/038,400, dated Oct. 30, 2015, 9 pages.

Notice of Allowance on U.S. Appl. No. 14/225,062, dated Dec. 2, 2015, 10 pages.

Second office action received in Chinese patent application No. 201380001530.1, dated Oct. 12, 2015, 5 pages with English translation.

Non-Final Office Action on U.S. Appl. No. 13/892,057, dated May 16, 2016, 23 pages.

Non-Final Office Action on U.S. Appl. No. 13/250,858, dated Mar. 18, 2016, 20 pages.

Notice of Allowance on U.S. Appl. No. 14/814,020, dated Aug. 12, 2016, 15 pages.

\* cited by examiner

HEAD UP DISPLAY (HUD) USING A BENT WAVEGUIDE ASSEMBLY

CROSS REFERENCE TO RELATED APPLICATIONS

The present application is related to: U.S. patent application Ser. No. 13/250,940, filed Sep. 30, 2011, U.S. patent application Ser. No. 13/251,087, filed Sep. 30, 2011, by Stahl et al., U.S. patent application Ser. No. 13/250,858, filed Sep. 30, 2011, Brown et al., U.S. patent application Ser. No. 13/250,970, filed Sep. 30, 2011, by Burns et al., U.S. patent application Ser. No. 13/250,994, filed Sep. 30, 2011, by Wood et al., U.S. patent application Ser. No. 13/250,621, filed Sep. 30, 2011, by Brown et al., and U.S. patent application Ser. No. 13/892,057, filed on an even date herewith by Stratton et al., all incorporated herein by reference herein in their entireties and assigned to the assignee of the present application.

BACKGROUND OF THE INVENTION

The present specification relates to displays. More particularly, the present specification relates to head up displays (HUDs).

Conventional HUDs are generally large, expensive and difficult to fit into small airplanes. Often, conventional HUDs rely on large lenses to form adequate field of view and viewing eye box. Compact HUDs are needed for tactical jets and other small aircraft where space is constrained in the cockpit. Substrate guided HUDs have been proposed which use waveguide technology with diffraction gratings to preserve eye box size while reducing lens size. U.S. Pat. No. 4,309,070 issued to St. Leger Searle and U.S. Pat. No. 4,711,512 issued to Upatnieks disclose substrate waveguide HUDS where the pupil of a collimating optical system is effectively expanded by the waveguide structure.

Modern cockpits are incorporating large area head down displays (LADs or LAHDDs). The LADs can provide panoramic views and large areas to the display information below the glare shield of the aircraft. However, such LADs do not provide HUD capabilities and require space in the cockpit that is required by conventional HUDs.

Accordingly, there is a need for a low profile HUD which is compatible with LADs. Therefore, there is a need for a HUD that can fit within the cockpit of a tactical aircraft or other small aircraft when an LAD is provided in the aircraft. Further, there is a need for a compact HUD for use with an LAD. There is further a need for a waveguide HUD that can accommodate small front end space well in front of the pilot and yet achieve satisfactory placement of the combiner. Further still, there is a need for a waveguide HUD that can fit in multiple envelopes, while having a larger instantaneous field of view (IFOV) and higher efficiency than conventional diving board configuration HUDs.

SUMMARY OF THE INVENTION

An exemplary embodiment relates to a head up display for providing light from an image source. The head up display comprises a waveguide assembly comprising a waveguide for disposition at an angle with respect to a top surface of a glare shield and a second waveguide disposed at an angle with respect to the first waveguide. The first waveguide has a first diffractive coupler at a first end, and the second waveguide has a second diffractive coupler at a second end. The first waveguide is positioned as a combiner and allows viewing of an outside scene and information from the image source. At least part of the first waveguide is disposed beneath a top surface of a glare shield.

Another exemplary embodiment relates to a method of providing information to a pilot. The method includes providing a light associated with the information from within a glare shield to an input coupler of a first substrate wave guide. The method also includes diffracting light out of a second waveguide at an output coupler. The second waveguide being disposed at an angle with respect to the first waveguide.

Another exemplary embodiment relates to a head up display comprising a collimator and a combiner assembly. The combiner assembly includes a first waveguide positioned to receive light from the collimator. The combiner assembly includes a second waveguide disposed as a combiner. The second waveguide is disposed at least partially above a glare shield.

BRIEF DESCRIPTION OF THE DRAWINGS

Exemplary embodiments are hereafter described with reference to the accompanying drawings, wherein like numerals denote like elements; and.

DETAILED DESCRIPTION OF THE PREFERRED EMBODIMENTS

Before describing in detail the particular improved system and method, it should be observed that the invention includes a novel structural combination of optical components, but is not limited to the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Figure 1:
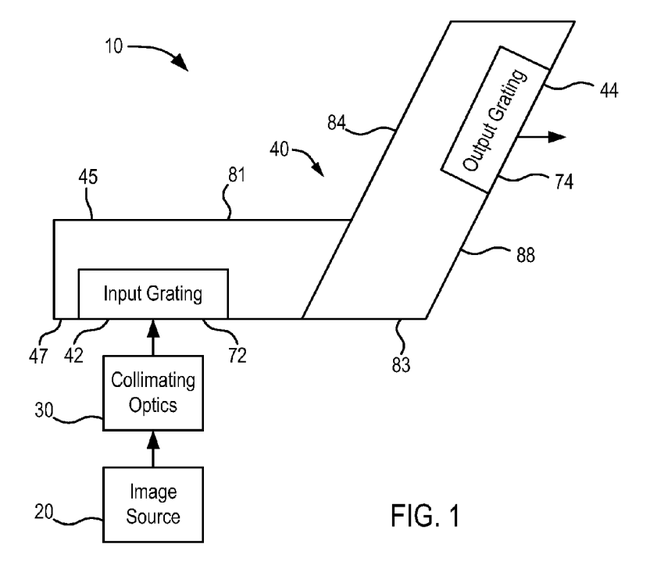
FIG. 1 is a general block diagram of a head up display (HUD) system including a bent waveguide assembly with an input and output coupler in accordance with an exemplary embodiment.

With reference to FIG. 1, a head up display (HUD) system 10 can be utilized in various applications, including aviation, medical, naval, targeting, ground based, military, etc. HUD system 10 is preferably configured for use in smaller cockpit environments and yet provides an appropriate field of view and eye box for avionic applications. In one embodiment, HUD system 10 is configured for use in a tactical cockpit and is compatible with large area head down displays (LADs).

HUD system 10 preferably includes an image source 20 and a waveguide assembly 40. Image source 20 can be any device for providing an image including but not limited to a CRT display, an LED display, an active matrix liquid crystal display (LCD), a light emitting diode, laser illuminator etc.

In one embodiment, image source 20 is a micro LCD assembly or liquid crystal or silicon-based display and can provide linearly (e.g., s or p) polarized light. Image source 20 can include a laser or LED backlight.

In addition, system 10 can include collimating optics 30 disposed between substrate waveguide assembly 40 and image source 20. Collimating optics 30 can be a single optical component, such as a lens, or include multiple optical components. In one embodiment, collimating optics 30 are configured as a catadioptric collimator. Collimating optics 30 can be any optical component or configuration of optical components that provide light (preferably collimated light) from image source 20 to substrate waveguide assembly 40. Collimating optics 30 can be integrated with or spaced apart from image source 20 and/or waveguide assembly 40.

Waveguide assembly 40 includes a first substrate waveguide 81 and a second substrate waveguide 83 in one embodiment. Waveguide 81 is disposed at an angle (e.g., 90-135 degrees) with respect to waveguide 83 in one embodiment. Waveguide 81 and waveguide 83 can be disposed at different angles from each other depending upon design criteria and space constraints. Waveguide 81 and waveguide 83 can be spaced apart from each other in one embodiment.

In operation, system 10 provides images from image source 20 to a pilot or other operator so that the pilot can simultaneously view the images and a real world scene. The images can include graphic and/or text information (e.g., flight path vector, target icons, etc.) related to avionic information in one embodiment. In addition, the images can include synthetic or enhanced vision images. In one embodiment, collimated light representing the image from image source 20 is provided on waveguide assembly 40 so that the pilot can view the image conformally on the real world scene through waveguide assembly 40. In one embodiment, waveguide assembly 40 is preferably transparent for viewing the real world scene through main surfaces or sides 84 and 88 of substrate waveguide 83.

In one embodiment, system 10 is configured to provide uniform luminance and expand the pupil of system 10 in a single axis (e.g., along a vertical axis). Waveguide assembly 40 can effect the single axis pupil expansion using an input coupler 42 and an output coupler 44 that is configured to provide uniform luminance. The single axis expansion can be on the order of 2 to 7 times (e.g., approximately 4 times in one preferred embodiment). Other orders of pupil expansion are possible depending upon performance criteria, design parameters, and optical components utilized without departing from the scope of the invention.

Couplers 42 and 44 can be a gradient coupling gratings that provides excellent image quality and acceptable brightness in a preferred embodiment. Couplers 42 and 44 are preferably implemented as any type of diffraction grating (e.g., dichromated gratings, holographic or surface relief gratings in a high refractive index (e.g., n>1.5) dielectric materials) in one embodiment. Couplers 42 and 44 can be implemented according to a number of techniques including but not limited to mechanical reproduction, holographic formation, embossing, casting (e.g., into a polymer resin), or lithography.

In operation, substrate waveguide assembly 40 advantageously receives light from image source 20 provided through collimating optics 30 to coupler 42 at an input 72 and provides light to a user to coupler 44 at output 74. Image source 20 provides information using a single color of light (e.g., green light approximately between 500 and 550 nanometers (nm)) in one embodiment. Light provided to substrate waveguide assembly 40 is preferably linearly S-polarized or P-polarized and collimated. Alternatively, other polarization, multiple colors, or other colors at different wavelengths can be utilized without departing from the scope of the invention. Optics 30 can have an output disposed directly adjacent or attached to coupler 42.

Waveguide assembly 40 preferably performs two operations in one embodiment. First, waveguide assembly 40 is disposed to provide a medium for transporting light by total internal reflection from coupler 42 at input 72 to coupler 44 at output 74. Light is reflected multiple times off of opposing sides 45 and 47 of waveguide 81 and opposing sides 84 and 88 of waveguide 83 as it travels from input 72 to output 74. Second, waveguide 83 of waveguide assembly 40 operates as a combiner allowing the user to view the light from image source 20 at output 74 and light from the real world scene through sides 84 and 88.

Light from collimating optics 30 first strikes coupler 42 at input 72 on side 47 of substrate waveguide assembly 40. Coupler 42 diffracts light the length of waveguide 81 so that it travels by total internal reflection (TIR) to waveguide 83. Light travels the length of waveguide 83 to output 74. At output 74, coupler 44 diffracts the light toward the user and out of the substrate waveguide assembly 40. Alternatively, mirror coatings can be provided on surfaces 45 and 47 of waveguide 81 so that TIR does not necessarily have to be relied upon. While less efficient than TIR, this embodiment can expand the range of angles that the light can propagate down waveguide 81 and still transfer into waveguide 83 and out to the pilot.

Coupler 42 at input 72 preferably has a greater efficiency than coupler 44 at output 74 in one embodiment. In one example, coupler 42 has an efficiency of as high as possible and coupler 44 has an efficiency low enough to ensure multiple opportunities for the propagating totally internally reflected light to interact with coupler 44 for pupil expansion. Alternative efficiency characteristics for couplers 42 and 44 can be utilized.

Couplers 42 and 44 are disposed on respective same sides 47 and 88 or same sides 45 and 84 of substrate waveguide assembly 40 in one embodiment. Couplers 42 and 44 can also be formed on the opposing sides 84 and 47, opposing sides 88 and 45 of waveguide assembly 40, or within waveguides 81 and 83 in alternative embodiments.

Couplers 42 and 44 are disposed in respective areas that are rectangular in shape and have the same width as each other in one embodiment. Alternatively, couplers 42 and 44 can have different widths and shapes. Coupler 44 has a greater height than coupler 42 in one embodiment.

Figure 2:
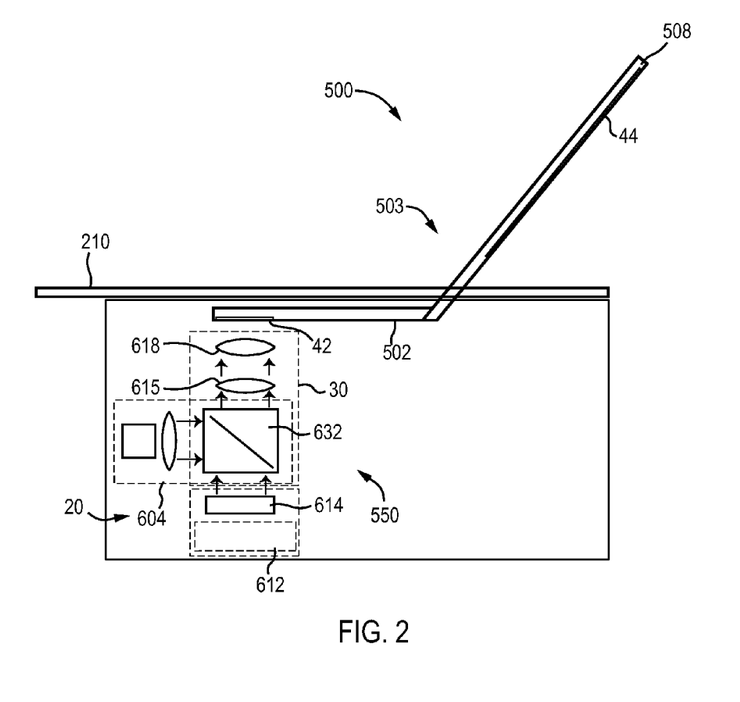
FIG. 2. is a side view schematic drawing of the HUD system illustrated in FIG. 1 including components mounted in a glare shield in accordance with another exemplary embodiment.

With reference to FIG. 2, a HUD system 500 is similar to HUD system 10 and is comprised of projector 550 and substrate waveguide assembly 503 similar to waveguide assembly 40 in one embodiment. Substrate waveguide assembly 503 is provided partially beneath a top surface of glare shield 210 in one embodiment. Substrate waveguide assembly 503 can be partially disposed through glare shield 210 such that the input end of waveguide assembly 503 is beneath glare shield 202.

Waveguide assembly 503 includes a substrate waveguide 508 similar to waveguide 83 and a substrate waveguide 502 similar to waveguide 81. Waveguide 502 is disposed entirely beneath a glare shield 210 in one embodiment, and waveguide 508 is partially disposed below glare shield 210 in one embodiment. Waveguide 502 is disposed at an angle with respect to waveguide 508. In one embodiment, the angle is between 90 and 140 degrees (e.g., 125 degrees). Alternative angles can be utilized depending upon system criteria and design parameters.

Projector 550 can include image source 20 and collimating optics 30. Image source 20 preferably includes a backlight 612 which can be an LED backlight in one embodiment. Image source 20 can also include an active matrix LCD 614 although other types of imaged displays are available according to alternative embodiments.

In one embodiment, image source 20 is an LCOS based system including a beam splitter 632, an LED or laser illuminator 604, and a LCOS display in the position of LCD 614. Beam splitter 632 receives s-polarized light and provides the light to the LCOS micro display which selectively rotates the polarization to p-polarized light in one embodiment. The p-polarized light is provided through beam splitter 632 and collimating optics 30. Collimating optics 30 includes a lens 615 and a lens 618 in one embodiment. Lens 615 and lens 618 are configured to provide collimated light to coupler 42.

HUD system 500 provides significant advantages including increased optical efficiency, reduced part count, reduced cost and reduced size. The use of conventional, low profile HUDs with waveguides that direct light to a combiner and then reflect the light to the pilot in a diving board have inherent problems due to optical efficiency and reflection aspects of the combiner.

Light from collimating optics 30 advantageously enters waveguide assembly 503 beneath glare shield 210 at input coupler 42. Light is provided through waveguide assembly 503 in a manner similar to waveguide assembly 40 discussed above to output coupler 44 for viewing by the pilot.

Projector 550 and waveguide 502 are disposed beneath the surface of glare shield 210 to provide a compact space saving design that does not interfere with space for a LAD and yet disallows waveguide 508 (the combiner waveguide) to be placed sufficiently close to the pilot in one embodiment. Waveguide 502, can be parallel to the top surface of glare shield 210. Alternatively, waveguide 502 can be displayed at an angle with respect to the top surface of glare shield 210.

Although specific components are discussed for projector 550, various optical components can be utilized. The collimating optics 30 shown in FIG. 2 are not shown in a limiting fashion. Other collimating systems can be utilized. In one embodiment, optics 30 are disposed directly adjacent to input coupler 42 of HUD system 500.

The bent configuration of waveguide assembly 503 allows an array of input coupling angles from the collimating optics 30 to be used. In one embodiment, the bent configuration of waveguide assembly 503 can allow various input coupling angles from optics 30 that can fit within the chassis, with the only limitations being the collimator fit and the required angles out to the pilot's eye motion box.

In one embodiment, two diffraction gratings couplers (e.g., couplers 42 and 44) are utilized to provide appropriate input and output coupler angles for assembly 503. Couplers 42 and 44 are matched in grating period and work in the positive and negative orders to correct for chromatic dispersion.

Figure 3:
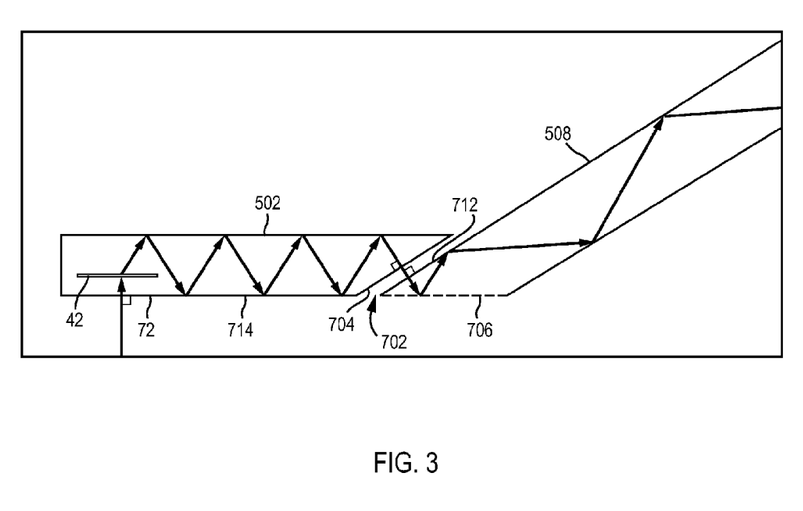
FIG. 3 is an exploded view of an interface associated with the bent waveguide assembly of the HUD system illustrated in FIG. 2 according to an exemplary embodiment.

With reference to FIG. 3, an interface 702 associated with waveguide 502 and waveguide 508 includes a cleaved end 704 and a cleaved end 706. Ends 704 and 706 are configured to ensure total internal reflection as light travels from waveguide 502 to waveguide 503. In one embodiment, end 704 is at the same angle with respect to surface 714 as the angle of waveguide 508 with respect to waveguide 502. Side 712 facing end 704 of waveguide 502 is parallel to cleave end 704 to couple the light into waveguide 508 (e.g., the combiner waveguide) from waveguide 502 (e.g., the horizontal waveguide) and to prevent dispersion in one embodiment.

The bend at interface 702 from horizontal orientation to the combiner orientation is configured such that the chief ray incident on end 704 is the same as the chief ray incident on the input 72 of waveguide 502 from optics 30 An incorrect angle can induce chromatic dispersion. In one embodiment, the angle of the chief ray can be 90 degrees (e.g., between 70 and 110 degrees). Other angles are possible.

In one embodiment, light that is in waveguide 508 is reflected up towards output coupler 44. Bottom or cleaved end 706 of waveguide 508 is configured such that the light in the TFOV undergoes total internal reflection into waveguide 508 when it strikes end 706. In one embodiment, the angle of end 706 of waveguide 508 with respect to surface 712 determines the bounce path length of the ray. With too shallow of an angle, the ray does not undergo total internal reflection (TIR). With too oblique of an angle, the bounce path is too long and there are gaps in the image at output coupler 44. Cleaved end 706 can be at various angles depending on optical design considerations. In one embodiment, end 706 is at an angle of 10 to 60 degrees with respect to side 712.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Various changes may be made to the details disclosed without departing from the spirit of the invention which is defined by the following claims.

What is claimed is:

1. A head up display for providing light from an image source, the head up display for disposition in a vehicle having a glare shield disposed above vehicle instrumentation, the glare shield having a top surface, the head up display comprising:

a waveguide assembly comprising a first waveguide disposed at an angle with respect to the top surface of the glare shield and a second waveguide disposed at an angle with respect to the first waveguide, the first waveguide having a first diffractive coupler at a first end of the first waveguide and the second waveguide having a second diffractive coupler at a second end of the second waveguide, and the first waveguide being positioned as a combiner and allowing viewing of an outside scene and information from the image source, wherein at least part of the first waveguide is configured to be disposed beneath the top surface of the glare shield, wherein the second waveguide is disposed entirely below the top surface and a first end of the second waveguide provides light to a second end of the first waveguide beneath the top surface of the glare shield, wherein the second waveguide is configured so that the light travels from the second end of the first waveguide to the first end of the second waveguide by total internal reflection, wherein the first waveguide and the second waveguide are not a single waveguide and the first waveguide is tilted with respect to the second waveguide, wherein the second diffractive coupler is provided at a planar main surface of the second waveguide, the planar main surface being approximately parallel to the glare shield.

2. The head up display of claim 1, wherein the first and second diffractive couplers are diffraction gratings.

3. The head up display of claim 2, wherein the first and second diffractive couplers are surface relief gratings.

4. The head up display of claim 3, wherein the first and second diffractive couplers are holographic diffractive elements and the vehicle is an aircraft.

5. The head up display of claim 1, wherein the image source is part of a projector disposed entirely below the top surface of the glare shield, wherein the projector is disposed below the second waveguide at the second end of the second waveguide, wherein the second waveguide is disposed substantially parallel to the top surface of the glare shield.

6. The head up display of claim 1, wherein the first waveguide is disposed at an obtuse degree angle with respect to the second waveguide.

7. The head up display of claim 5, wherein light from the image source enters the second waveguide via the second diffractive coupler at the second end vertically with respect to gravity at the planar main surface, the planar main surface being a bottom surface and the bottom surface is horizontal with respect to gravity.

8. The head up display of claim 7, wherein second waveguide is at an obtuse angle with respect to the first waveguide.

9. The head up display of claim 1, wherein the light from a primary ray enters the first waveguide at a 90° angle from a surface of the first waveguide and leaves the second waveguide at a 90° angle from a surface of the second waveguide.

10. The head up display of claim 1, wherein the second diffractive coupler has a greater efficiency than the first diffractive coupler.

11. A cockpit comprising:
a glare shield for shielding aircraft instrumentation having a top surface; and
a head up display comprising:
 a collimator; and
 a combiner assembly, wherein the combiner assembly includes a first waveguide positioned to receive light from the collimator, wherein the combiner assembly includes a second waveguide disposed as a combiner, the second waveguide being disposed at an angle with respect to the first waveguide, the second waveguide being disposed at least partially above a top surface of the glare shield, the first waveguide having a first waveguide end disposed next to a second waveguide end of the second waveguide beneath the top surface of the glare shield, the first waveguide and the collimator being entirely disposed beneath the top surface of the glare shield, wherein the collimator is entirely disposed beneath a main planar surface of the first waveguide, wherein the main planar surface includes an input coupler configured to receive light from the collimator and the main planar surface is disposed approximately parallel to the top surface of the glare shield.

12. The cockpit of claim 11, wherein image source includes a laser or LED illuminator providing light through a beam splitter.

13. The cockpit of claim 11, wherein an output diffraction grating for the combiner is disposed above the glare shield and the second waveguide is not parallel to a top surface of the glare shield.

14. The cockpit of claim 11, wherein the first waveguide includes a diffraction grating.

* * * * *